United States Patent
Galan-Oliveras et al.

(10) Patent No.: US 11,040,695 B2
(45) Date of Patent: Jun. 22, 2021

(54) ALERT SYSTEM TECHNOLOGY TO CONDUCT IN-CABIN CHILD RESTRAINT SYSTEM MONITORING AND FACILITATE COMPLIANCE WITH LOCATION-DEPENDENT CONSTRAINTS

(71) Applicant: Intel Corporation, Santa Clara, CA (US)

(72) Inventors: Magdiel Galan-Oliveras, Chandler, AZ (US); Rita Chattopadhyay, Chandler, AZ (US); Subramanian Anandaraj, Chandler, AZ (US); Pradeep Sakhamoori, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/583,447

(22) Filed: Sep. 26, 2019

(65) Prior Publication Data

US 2020/0017069 A1    Jan. 16, 2020

(51) Int. Cl.
*B60R 22/48* (2006.01)
*G06K 9/00* (2006.01)
*B60R 11/04* (2006.01)
*G01C 21/28* (2006.01)
*B60R 11/00* (2006.01)

(52) U.S. Cl.
CPC .......... *B60R 22/48* (2013.01); *G06K 9/00838* (2013.01); *B60R 11/04* (2013.01); *B60R 2011/0003* (2013.01); *B60R 2022/4816* (2013.01); *B60R 2022/4841* (2013.01); *B60R 2022/4858* (2013.01); *B60R 2022/4866* (2013.01); *G01C 21/28* (2013.01)

(58) Field of Classification Search
CPC . B60R 22/48; B60R 11/04; B60R 2022/4841; B60R 2022/4858; B60R 2022/4866; B60R 2011/0003; B60R 2022/4816; G06K 9/00838; G06K 9/00369; G01C 21/28
USPC ........................................................ 348/148
See application file for complete search history.

(56) References Cited

U.S. PATENT DOCUMENTS

2008/0246316 A1* 10/2008 Carine ................. B60N 2/2812
                                                          297/216.11
2009/0234542 A1*  9/2009 Orlewski .......... B60R 21/01546
                                                              701/45

\* cited by examiner

*Primary Examiner* — Jared Walker
(74) *Attorney, Agent, or Firm* — Jordan IP Law, LLC

(57) ABSTRACT

Methods, systems and apparatuses may provide for technology that conducts an automated vision analysis of image data associated with an interior of a vehicle cabin, determines a state of a child restraint system (CRS) based on the automated vision analysis, and generates an alert if the state of the CRS does not satisfy one or more safety constraints. In one example, the technology identifies the safety constraint(s) based on a geographic location of the vehicle cabin.

20 Claims, 5 Drawing Sheets

ALERT SYSTEM TECHNOLOGY TO CONDUCT IN-CABIN CHILD RESTRAINT SYSTEM MONITORING AND FACILITATE COMPLIANCE WITH LOCATION-DEPENDENT CONSTRAINTS

TECHNICAL FIELD

Embodiments generally relate to child restraint system (CRS) monitoring. More particularly, embodiments relate to alert system technology that conducts in-cabin CRS monitoring and facilitates compliance with location-specific constraints.

BACKGROUND

The proper installation and usage of a CRS (e.g., car seat, booster seat) may depend on a number of factors that are challenging for parents and/or guardians to consider. For example, age and weight appropriateness, direction (e.g., rear-facing or forward-facing), location in relation to air bags, safety belt tightness and the locking clip configuration of a CRS may all determine whether the CRS is being properly used. Moreover, regulations over CRS installation may vary across different localities (e.g., states, regions, countries). As a result, CRS safety compliance may be difficult for most end users.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
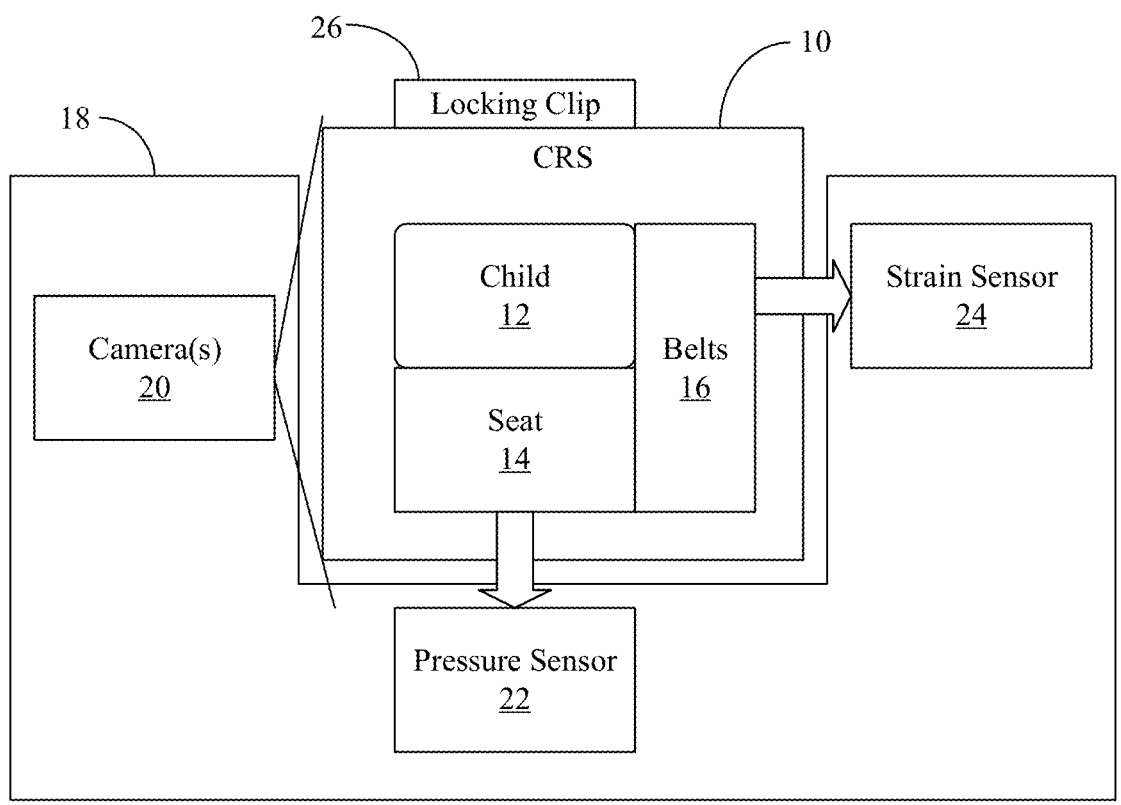
FIG. 1 is a block diagram of an example of an in-cabin CRS monitoring configuration according to an embodiment.

FIG. 1 shows a child restraint system (CRS) 10 such as, for example, a child seat, a booster seat, etc., that is used to enhance the safety of a child 12 while traveling in a vehicle (e.g., car, truck, airplane, etc., not shown). In the illustrated example, the CRS 10 includes a seat 14 and one or more belts 16 (e.g., harnesses) to secure the child 12 within the CRS 10 and secure the CRS 10 within the vehicle. In an embodiment, an automated monitoring system 18 includes one or more cameras 20 to capture images (e.g., video frames, still images) of the CRS 10 and the child 12 while the CRS 10 is installed in the vehicle. Additionally, the monitoring system 18 may include a pressure sensor 22 coupled to the seat 14 and a strain sensor 24 coupled to the belts 16. As will be discussed in greater detail, the automated monitoring system 18 may use the images from the camera(s) 20, data and/or signals from the pressure sensor 22, and data and/or signals from the strain sensor 24 to automatically determine whether the CRS 10 is installed and used in compliance with one or more safety constraints (e.g., national and/or local regulations).

For example, automated vision analysis on the images may enable the age of the child 12 to be estimated based on child growth tables and the size of detected bodily features such as, for example, the head, limbs, torso, face, etc., of the child 12. Thus, the automated vision analysis might be conducted by an artificial neural network (e.g., convolutional neural network/CNN) that is trained on classified image data (e.g., containing various images of children in car seats). The automated vision analysis may also estimate other parameters such as the orientation of the CRS 10 (e.g., front-facing or rear-facing), the location of the CRS 10 within the vehicle cabin (e.g., relative to air bags), the tilt angle of the CRS 10, the condition of a tethering/locking clip 26, and so forth.

In an embodiment, the data/signals from the pressure sensor 22 are used to determine the weight of the child 12 (e.g., based on a pressure pattern), wherein the weight of the child 12 is an input to, for example, the age determination. Additionally, the data/signals from the strain sensor 24 may be used to automatically determine the amount of tension in the belts 16. The automated monitoring system 18 may also compare the monitored parameters to safety constraints that specify the manner in which the CRS 10 is to be installed and used during transport of the child 12. If the monitored parameters are out of compliance, the illustrated system 18 generates an alert.

Moreover, the monitoring system 18 may account for location-dependent aspects of the safety constraints. For example, if one locality requires two-year old children to be in a rear-facing direction and another locality permits two-year old children to be in a forward-facing direction, the monitoring system 18 may automatically determine whether the direction of the CRS 10 is in compliance based on the geographic location (e.g., current or future) of the vehicle. The illustrated monitoring system 18 therefore enhances the safety of the child 12 by automatically identifying improper installations and/or usages of the CRS 10 and alerting parents, guardians, etc., as to the improper installations/usages. Table I below provides an example of the technology that may be used to detect various types of CRS misuse.

TABLE I

| Misuse Type | Technology |
| --- | --- |
| age and weight appropriateness of CRS | Vision system and pressure sensor assess type of CRS (e.g., car seat vs. booster, vs. seat-belt) |
| | Vision system assesses child's age group (e.g., infant, vs. toddler, vs. pre-teen) |
| | Car Seat sensors estimate child weight: pressure pattern recognizes seat pattern + weight delta, which combined with vision system recognizes an empty seat |
| | Vision & pressure sensors validate limits allowed by the car seat manufacturer when the child is within the seat's maximum height/weight |
| direction of CRS (facing rear or forward of vehicle) | Vision system assesses the type of CRS (e.g., car seat vs. booster, vs. seat-belt) |
| | Vision system assesses the child's age group (e.g., infant, vs. toddler, vs. pre-teen) |
| placement of CRS in relation to air bags | Seat pressure sensors evaluate position vs. any corresponding seat airbags. |

TABLE I-continued

| Misuse Type | Technology |
| --- | --- |
| installation and secureness of CRS to the vehicle seat (tight safety belt) | Pressure sensors on the seat. Force sensors on the belt Vision system monitors extent of seat free-play |
| secureness/tightness of harness straps and crotch strap of the CRS | Force sensors on the belt Vision system monitors extent of seat free-play |
| use of locking clip for certain vehicle safety belts | Vision system validates seat type, need for clip Vision system validates the presence of clip |
| fit of vehicle safety belts across child in belt-positioning booster seat | Vision system validates booster seat type Vision system validates belt |
| defective or broken CRS elements | Vision system conducts pattern matching over time |

Figure 2:
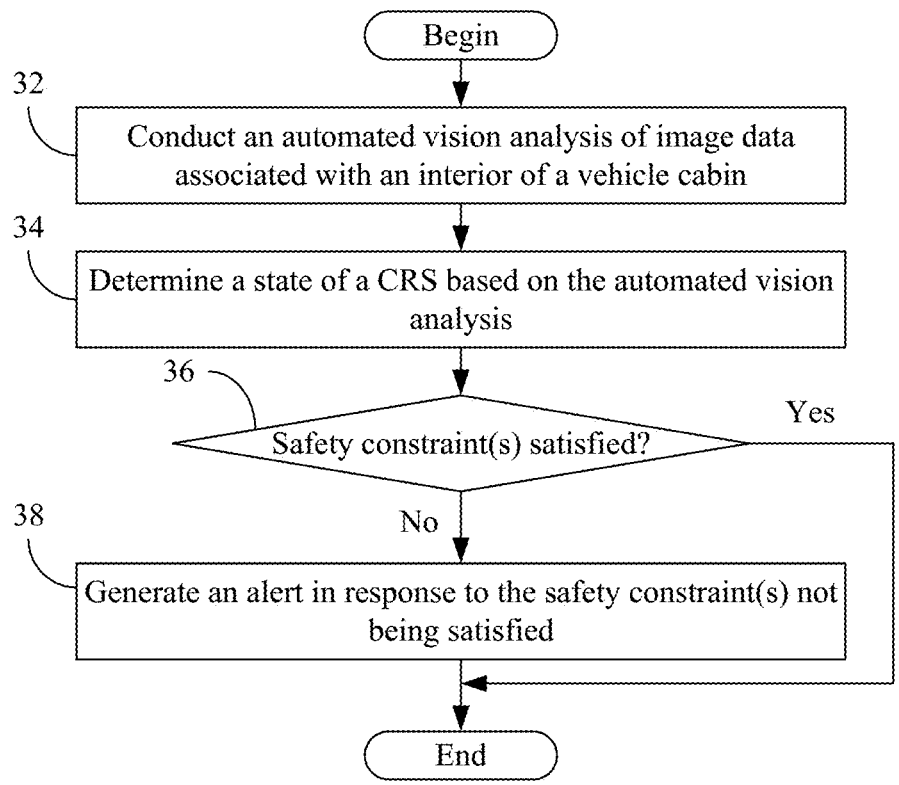
FIG. 2 is a flowchart of an example of a method of operating a safety-enhanced computing system according to an embodiment.

FIG. 2 shows a method 30 of operating a safety-enhanced computing system. The method 30 may generally be implemented in an automated monitoring system such as, for example, the system 18 (FIG. 1), already discussed. More particularly, the method 30 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 30 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 32 provides for conducting an automated vision analysis of image data associated with an interior of a vehicle cabin. In an embodiment, block 32 includes performing (e.g., via a CNN) object detection and/or recognition on images of a CRS and/or child seated in the CRS. The output of block 32 might be, for example, a set of features (e.g., head size, CRS direction, type of CRS, etc.) and corresponding levels of confidence in the features. Block 34 automatically determines the state of the CRS based on the automated vision analysis. Thus, block 34 might translate the head size with the highest level of confidence into an estimated age of the child. In another example, block 34 translates the locking tab condition with the highest level of confidence into a specific state (e.g., secured, not secured, exhibiting wear).

A determination may be made at block 36 as to whether one or more safety constraints are satisfied. In an embodiment, block 36 includes comparing the state of the CRS to criteria such as, for example, age and weight appropriateness, direction of the CRS, placement of the CRS in relation to air bags, installation and secureness of the CRS to the vehicle seat, secureness/tightness of harness straps and crotch straps, use of a locking clip to tether the CRS, fit of vehicle safety belts across the child in a belt-positioning booster seat, defective or broken CRS elements, etc., or any combination thereof. The safety constraint(s) may be documented in a suitable data structure such as, for example, a database, digital table, etc. If it is determined at block 36 that one or more safety constraints are not satisfied, block 38 automatically generates an alert in response to the safety constraint(s) not being satisfied. In an embodiment, block 38 includes sending a notification message to a display and/or speaker of the vehicle, a display and/or speaker of a mobile device (e.g., smartphone, wearable device, etc.), and so forth. If it is determined at block 36 that the safety constraint(s) are satisfied, the method 30 bypasses block 38 and terminates.

Figure 3:
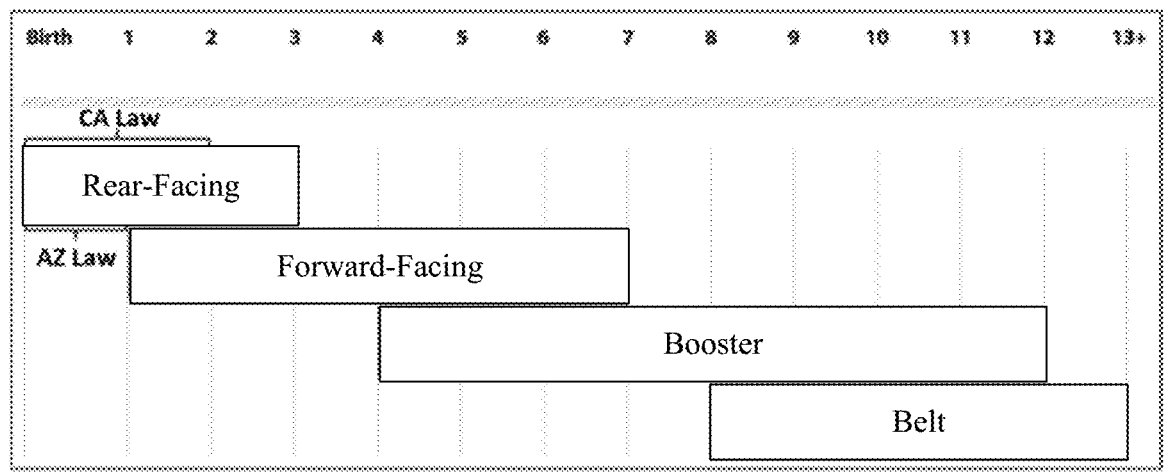
FIG. 3 is a chart of an example of location-dependent constraints according to an embodiment.

FIG. 3 shows a chart 40 of general CRS constraints for the U.S. states of California (CA) and Arizona (AZ). Additionally, Table II below shows age (years), height (inches), and weight (pounds) constraints for California and Arizona. The values presented in the chart 40 and Table II are examples for the purposes of discussion and may vary depending on the circumstances (e.g., legislative and/or regulatory changes, etc.).

TABLE II

| | REAR-FACING | | | FORWARD-FACING | | | BOOSTER | | | BELT | | |
| --- | --- | --- | --- | --- | --- | --- | --- | --- | --- | --- | --- | --- |
| STATE | AGE | HEIGHT | WEIGHT | AGE | HEIGHT | WEIGHT | AGE | HEIGHT | WEIGHT | AGE | HEIGHT | WEIGHT |
| ::: AZ ::: | <1 | | <20 | <5 | <57 | | <8 | <57 | | >8 | >57 | |
| CA ::: | <2 | <40 | <40 | | | | <8 | <57 | | >8 | >57 | |

Thus, traveling from one geographic location to another may present compliance challenges. For example, while infants in Arizona older than one year may be positioned front-facing in a vehicle, they would be in violation of California laws upon crossing the state line (e.g., if the infant is under 2 years old and is required to be positioned rear-facing under California law).

With continuing reference to FIGS. 2-3, block 36 may identify the safety constraint(s) based on a geographic location of the vehicle cabin. In one example, the geographic location is the current geographic location that is determined further based on Global Positioning System (GPS) data associated with the vehicle. In another example, the geographic location is a future geographic location that is determined further based on navigation route (e.g., high definition/HD map) data. Thus, use of the navigation route data would facilitate the generation at block 38 of a message such as "this route contains differing car-seat regulations," which enables the end user to configure the CRS to be in compliance with the "lowest common denominator" of constraints in advance to embarking on the trip. Indeed, block 38 may alert the end user in a flying situation in which the Arizona family may rent a vehicle from the airport and unknowingly position the infant as they are accustomed in Arizona (e.g., but in violation of California law).

Of particular note is that the method 30 may be conducted after the CRS is installed in the vehicle (e.g., but before the child is seated in the CRS), after the child is seated in the CRS (e.g., but before the vehicle is placed in motion), and/or while the vehicle is in motion. Conducting the method 30 while the vehicle is in motion may enable additional data to be collected and analyzed with regard to the state of the CRS. For example, "free-play" (e.g., slack) in the seat belt and/or harness may be detected by the automated vision analysis during movement (e.g., lateral turns/lane changes, acceleration, deceleration) of the vehicle, where such data may be used to supplement or replace the data/signals from the strain sensor. Thus, the illustrated method 30 enhances the safety of the child by automatically identifying improper installations and/or usages of the CRS and alerting parents, guardians, etc., as to the improper installations/usages.

Figure 4:
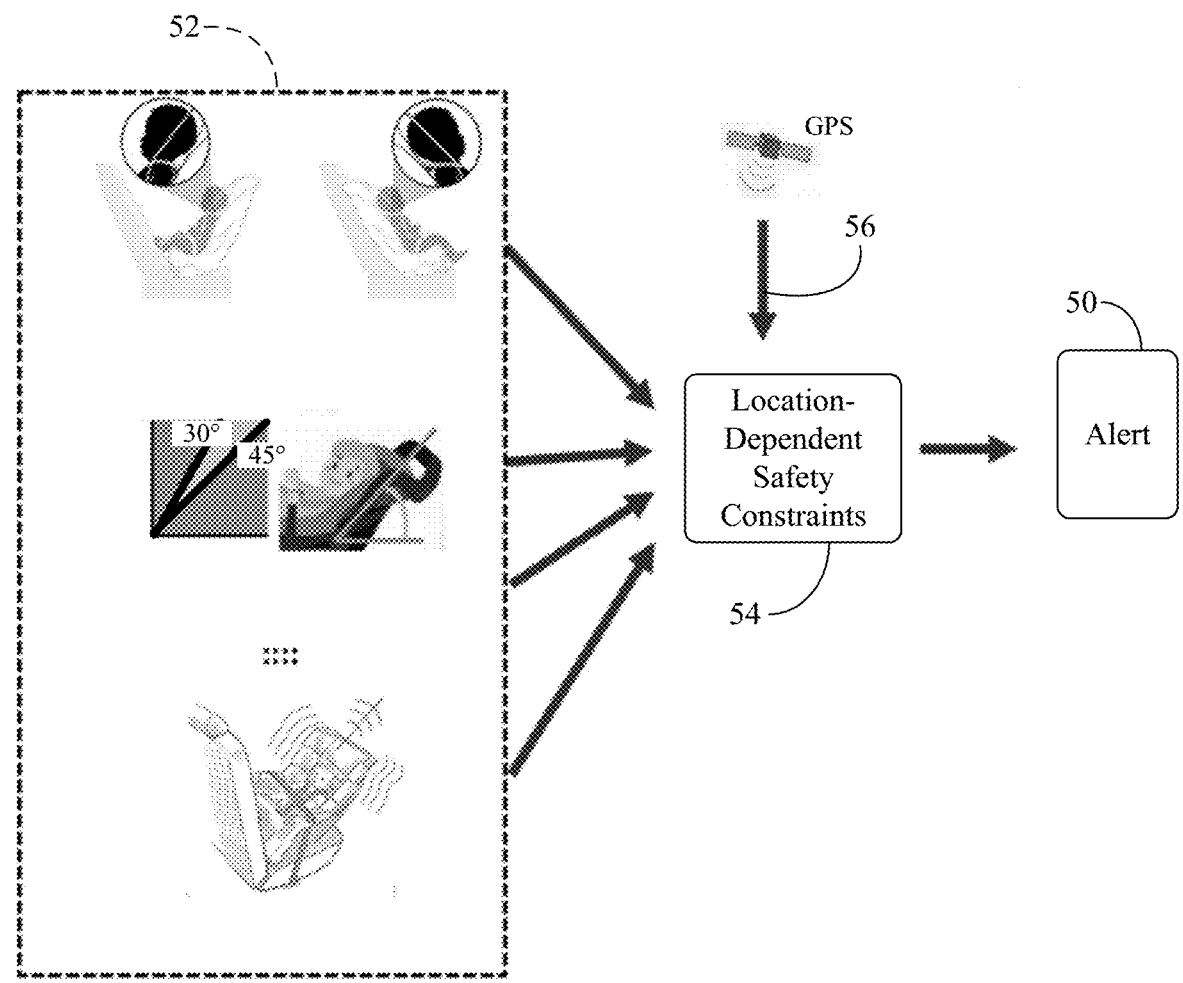
FIG. 4 is an illustration of an example of an alert generation according to an embodiment.

FIG. 4 shows the generation of an alert 50 when the state 52 of the CRS does not satisfy one or more location-dependent safety constraints 54. The state may specify, for example, whether the shoulder straps of the harness are at or below the shoulders when rear-facing or at or above the shoulders when forward-facing, whether the tilt angle of the CRS is near 30° for toddlers or near 45° for babies, whether there is lateral free-play in the CRS belts, and so forth. The angle values are examples for the purposes of discussion and may vary depending on the circumstances (e.g., legislative and/or regulatory changes, etc.). In the illustrated example, GPS data 56 is used to filter and/or select the constraint(s) 54 based on the location of the vehicle. As already noted, the alert 50 may be in the form of a notification message that is sent to a display and/or speaker of the vehicle, a display and/or speaker of a mobile device (e.g., smartphone, wearable device, etc.), and so forth.

Figure 5:
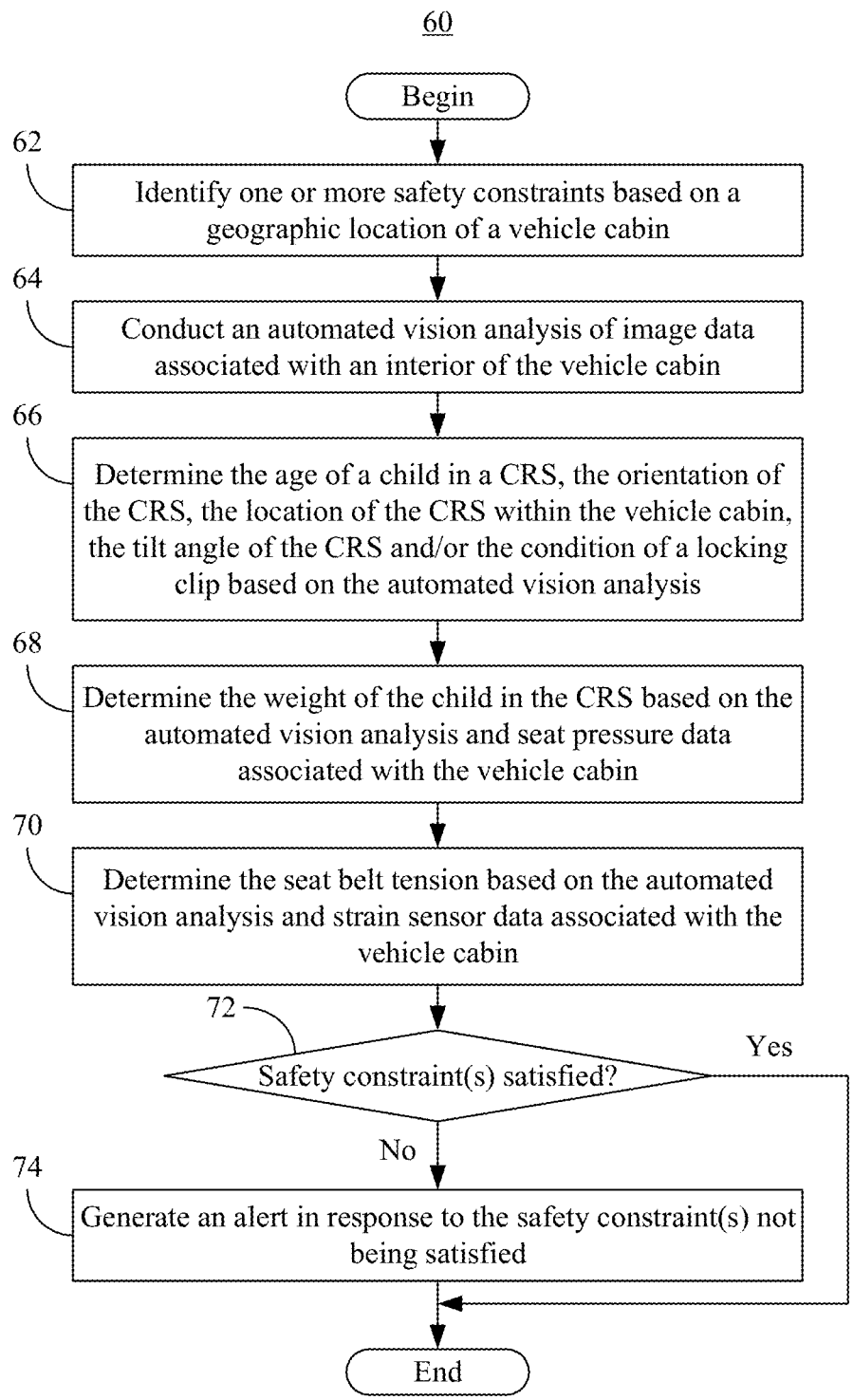
FIG. 5 is a flowchart of an example of a more detailed method of operating a safety-enhanced computing system according to an embodiment.

In this regard, FIG. 5 shows a more detailed method 60 of operating a safety-enhanced computing system. The method 60 may generally be implemented in an automated monitoring system such as, for example, the system 18 (FIG. 1), already discussed. More particularly, the method 60 may be implemented as one or more modules in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 62 identifies one or more safety constraints based on a geographic location of a vehicle cabin. As already noted, the geographic location might be a current geographic location (e.g., determined based on GPS data), a future geographic location (e.g., determined based on navigation route data), and so forth. Block 64 provides for conducting an automated vision analysis (e.g., including CNN-based object detection or recognition) of image data associated with the interior of the vehicle cabin. Block 66 may determine the age of a child in a CRS, the orientation of the CRS, the type of CRS (e.g., car seat or booster seat), the location of the CRS within the vehicle cabin, the tilt angle of the CRS and/or the condition of a locking clip based on the automated vision analysis.

In an embodiment, block 68 determines the weight of the child in the CRS based on the automated vision analysis and seat pressure data associated with the vehicle cabin. Additionally, the seat belt tension associated with the CRS is determined at block 70 based on the automated vision analysis and strain sensor data associated with the vehicle cabin. In one example, a determination is made at block 72 as to whether the one or more safety constraints are satisfied by the state of the CRS. If not, block 74 generates an alert (e.g., a notification message sent to a display/speaker of the vehicle and/or a display/speaker of a mobile device) in response to the safety constraint(s) not being satisfied. If the state of the CRS satisfies the safety constraint(s), the illustrated method 60 bypasses block 74 and terminates. The method 60, which may be conducted after the CRS is installed in the vehicle, after the child is seated in the CRS and/or while the vehicle is in motion, enhances the safety of the child by automatically identifying improper installations and/or usages of the CRS and alerting parents, guardians, etc., as to the improper installations/usages.

Figure 6:
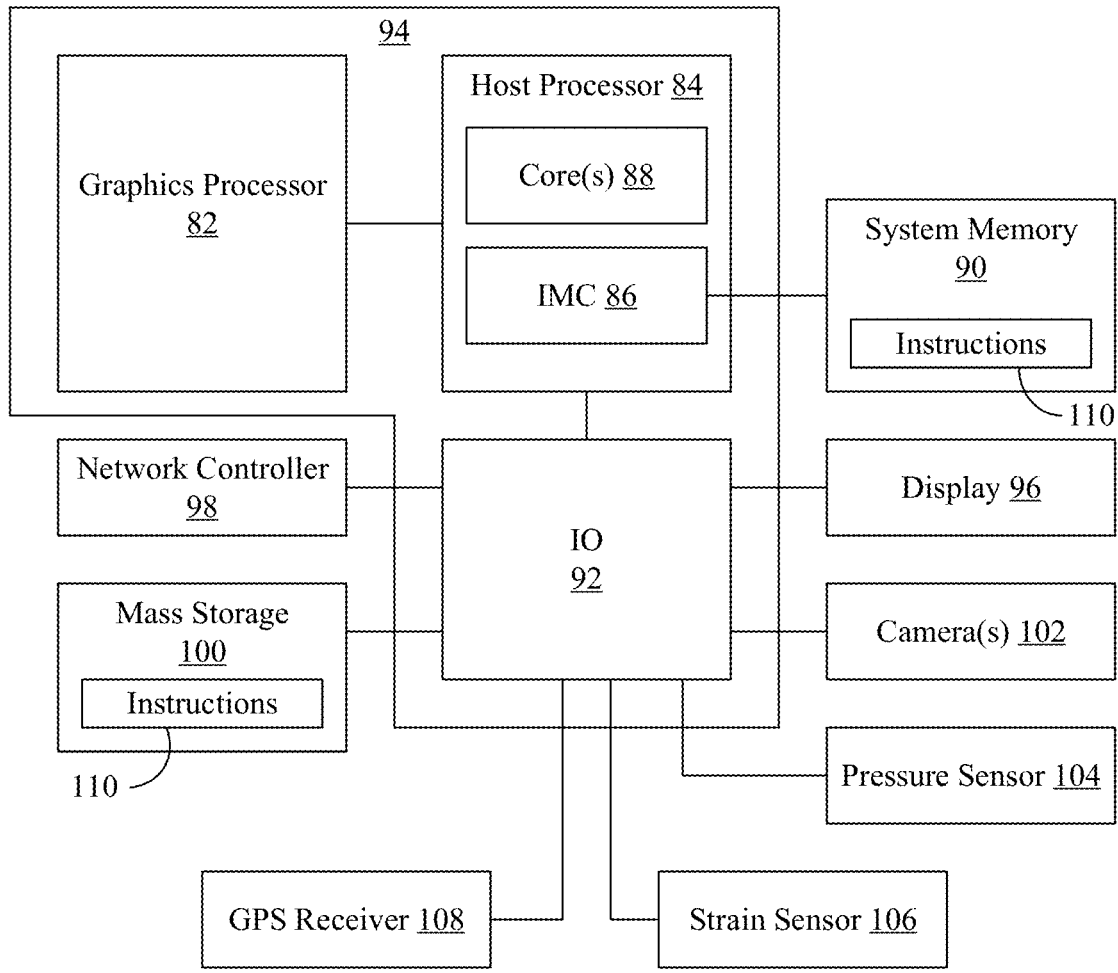
FIG. 6 is a block diagram of an example of a safety-enhanced computing system according to an embodiment.

FIG. 6 shows a safety-enhanced computing system 80. In an embodiment, the computing system 80 is substituted for the automated monitoring system 18 (FIG. 1), already discussed. In the illustrated example, the system 80 includes a graphics processor 82 (e.g., graphics processing unit/GPU) and a host processor 84 (e.g., central processing unit/CPU) having one or more cores 88 and an integrated memory controller (IMC) 86 that is coupled to a system memory 90. Additionally, the illustrated system 80 includes an input output (10) module 92 implemented together with the host processor 84 and the graphics processor 82 on an SoC 94 (e.g., semiconductor die). In one example, the IO module 92 communicates with a display 96, a network controller 98 (e.g., wired and/or wireless), mass storage 100 (e.g., hard disk drive/HDD, solid state drive/SSD, optical disc, flash memory, etc.), one or more camera(s) 102 (e.g., mounted within a vehicle cabin and generating image data associated with the interior of the vehicle cabin), a pressure sensor 104 (e.g., coupled to a seat of the vehicle cabin), a strain sensor 106 (e.g., coupled to a seat belt of the vehicle cabin) and a GPS receiver 108.

In the illustrated example, the mass storage 100 and/or the system memory 90 include a set of instructions 110, which when executed by the IO module 92, the host processor 84 and/or the graphics processor 82, cause the computing system 80 to implement one or more aspects of the method 30 (FIG. 2) and/or the method 60 (FIG. 5), already discussed. Thus, execution of the instructions 110 causes the computing system to conduct an automated vision analysis of the image data, determine the state of a CRS based on the automated vision analysis and generate an alert if the CRS does not satisfy one or more safety constraints. The state may include an age of a child in the CRS, the weight of the child in the CRS, the orientation of the CRS, the location of the CRS within the vehicle cabin, the tilt angle of the CRS, the seat belt tension associated with the CRS, the condition of a locking clip, etc., or any combination thereof. Additionally, the pressure sensor 104 may generate seat pressure sensor data associated with the vehicle cabin, wherein the weight of the child is determined further based on the seat pressure data. Moreover, the strain sensor 106 may generate strain sensor data associated with the vehicle cabin, wherein the seat belt tension is determined further based on the strain sensor data.

In an embodiment, the safety constraint(s) are identified based on the geographic location of the vehicle cabin. In this regard, the geographic location might be a current geographic location, wherein execution of the instructions 110 causes the computing system 80 to determine the current geographic location based on GPS data from the GPS receiver 108. Alternatively, the geographic location may be a future geographic location, wherein the future geographic location is determined further based on navigation route data. The computing system 80 is therefore considered "safety-enhanced" because it enhances the safety of the child by automatically identifying improper installations and/or usages of the CRS and alerting parents, guardians, etc., as to the improper installations/usages.

Figure 7:
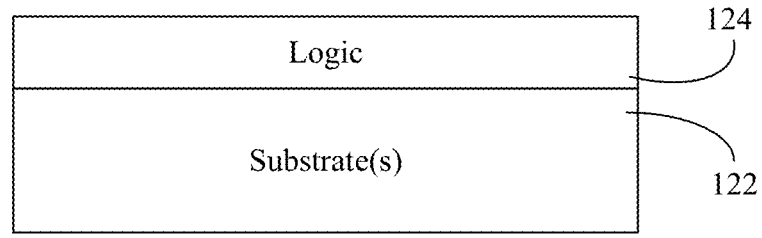
FIG. 7 is an illustration of an example of a semiconductor package apparatus according to an embodiment.

FIG. 7 shows a semiconductor apparatus 120 (e.g., chip, SoC). The illustrated apparatus 120 includes one or more substrates 122 (e.g., silicon, sapphire, gallium arsenide) and logic 124 (e.g., transistor array and other integrated circuit/IC components) coupled to the substrate(s) 122. In an embodiment, the logic 124 implements one or more aspects of the method 30 (FIG. 2) and/or the method 60 (FIG. 5), already discussed. Thus, the logic 124 may conduct an automated vision analysis of the image data, determine the state of a CRS based on the automated vision analysis and generate an alert if the CRS does not satisfy one or more safety constraints. The apparatus 120 therefore enhances the safety of children by automatically identifying improper installations and/or usages of the CRS and alerting parents, guardians, etc., as to the improper installations/usages.

The logic 124 may be implemented at least partly in configurable logic or fixed-functionality hardware logic. In one example, the logic 124 includes transistor channel regions that are positioned (e.g., embedded) within the substrate(s) 122. Thus, the interface between the logic 124 and the substrate(s) 122 may not be an abrupt junction. The logic 124 may also be considered to include an epitaxial layer that is grown on an initial wafer of the substrate(s) 122.

ADDITIONAL NOTES AND EXAMPLES

Example 1 includes a safety-enhanced computing system comprising one or more cameras to generate image data associated with an interior of a vehicle cabin, a processor coupled to the one or more cameras, and a memory coupled to the processor, the memory including a set of instructions, which when executed by the processor, cause the computing system to conduct an automated analysis of the image data, determine a state of a child restraint system (CRS) based on the automated vision analysis, and generate an alert if the status of the CRS does not satisfy one or more safety constraints.

Example 2 includes the computing system of Example 1, wherein the state includes one or more of an age of a child in the CRS, a weight of the child in the CRS, an orientation of the CRS, a location of the CRS within the vehicle cabin, a tilt angle of the CRS, a seat belt tension associated with the CRS or a condition of a locking clip.

Example 3 includes the computing system of Example 2, further including a pressure sensor to generate seat pressure sensor data associated with the vehicle cabin, wherein the weight of the child is to be determined further based on the seat pressure data.

Example 4 includes the computing system of Example 2, further including a strain sensor to generate strain sensor data associated with the vehicle cabin, wherein the seat belt tension is to be determined further based on the strain sensor data.

Example 5 includes the computing system of any one of Examples 1 to 4, wherein the instructions, when executed, cause the computing system to identify the one or more safety constraints based on a geographic location of the vehicle cabin.

Example 6 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to conduct an automated vision analysis of image data associated with an interior of a vehicle cabin, determine a state of a child restraint system (CRS) based on the automated vision analysis, and generate an alert if the state of the CRS does not satisfy one or more safety constraints.

Example 7 includes the semiconductor apparatus of Example 6, wherein the state includes one or more of an age of a child in the CRS, a weight of the child in the CRS, an orientation of the CRS, a location of the CRS within the vehicle cabin, a tilt angle of the CRS, a seat belt tension associated with the CRS or a condition of a locking clip.

Example 8 includes the semiconductor apparatus of Example 7, wherein the weight of the child is to be determined further based on seat pressure data associated with the vehicle cabin.

Example 9 includes the semiconductor apparatus of Example 7, wherein the seat belt tension is to be determined further based on strain sensor data associated with the vehicle cabin.

Example 10 includes the semiconductor apparatus of any one of Examples 6 to 9, wherein the logic coupled to the one or more substrates is to identify the one or more safety constraints based on a geographic location of the vehicle cabin.

Example 11 includes the semiconductor apparatus of Example 10, wherein the geographic location is a current geographic location and the current geographic location is to be determined further based on Global Positioning System (GPS) data.

Example 12 includes the semiconductor apparatus of Example 10, wherein the geographic location is a future geographic location and the future geographic location is to be determined further based on navigation route data.

Example 13 includes at least one computer readable storage medium comprising a set of instructions, which when executed by a computing system, cause the computing system to conduct an automated vision analysis of image data associated with an interior of a vehicle cabin, determine a state of a child restraint system (CRS) based on the automated vision analysis, and generate an alert if the state of the CRS does not satisfy one or more safety constraints.

Example 14 includes the at least one computer readable storage medium of Example 13, wherein the state includes one or more of an age of a child in the CRS, a weight of the child in the CRS, an orientation of the CRS, a location of the CRS within the vehicle cabin, a tilt angle of the CRS, a seat belt tension associated with the CRS or a condition of a locking clip.

Example 15 includes the at least one computer readable storage medium of Example 14, wherein the weight of the child is to be determined further based on seat pressure data associated with the vehicle cabin.

Example 16 includes the at least one computer readable storage medium of Example 14, wherein the seat belt tension is to be determined further based on strain sensor data associated with the vehicle cabin.

Example 17 includes the at least one computer readable storage medium of any one of Examples 13 to 16, wherein the instructions, when executed, cause the computing system to identify the one or more safety constraints based on a geographic location of the vehicle cabin.

Example 18 includes the at least one computer readable storage medium of Example 17, wherein the geographic location is a current geographic location and the current geographic location is to be determined further based on Global Positioning System (GPS) data.

Example 19 includes the at least one computer readable storage medium of Example 17, wherein the geographic location is a future geographic location and the future geographic location is to be determined further based on navigation route data.

Example 20 includes a method comprising conducting an automated vision analysis of image data associated with an interior of a vehicle cabin, determining a state of a child restraint system (CRS) based on the automated vision analysis, and generating an alert if the state of the CRS does not satisfy one or more safety constraints.

Example 21 includes the method of Example 20, wherein the state includes one or more of an age of a child in the CRS, a weight of the child in the CRS, an orientation of the CRS, a location of the CRS within the vehicle cabin, a tilt angle of the CRS, a seat belt tension associated with the CRS or a condition of a locking clip.

Example 22 includes the method of Example 20, wherein the weight of the child is determined further based on seat pressure data associated with the vehicle cabin.

Example 23 includes the method of Example 20, wherein the seat belt tension is determined further based on strain sensor data associated with the vehicle cabin.

Example 24 includes the method of any one of Examples 19 to 23, further including identifying the one or more safety constraints based on a geographic location of the vehicle cabin.

Example 25 includes means for performing the method of any one of Examples 19 to 24.

Technology described herein may therefore leverage pre-existing sensors (e.g., seat pressure sensors, interior cameras) to facilitate autonomous safety by reducing the incidence of improper infant restraining. The technology may also automatically generate alerts if a CRS is not in compliance with local laws and/or safety regulations.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
one or more cameras to generate image data associated with an interior of a vehicle cabin;
a processor coupled to the one or more cameras; and
a memory coupled to the processor, the memory including a set of instructions, which when executed by the processor, cause the computing system to:
conduct an automated vision analysis of the image data,
identify one or more safety constraints based on a geographic location of the vehicle cabin,
determine a state of a child restraint system (CRS) based on the automated vision analysis and identified one or more safety constraints, and
generate an alert if the state of the CRS does not satisfy the one or more safety constraints.

2. The computing system of claim 1, wherein the state includes one or more of an age of a child in the CRS, a weight of the child in the CRS, an orientation of the CRS, a location of the CRS within the vehicle cabin, a tilt angle of the CRS, a seat belt tension associated with the CRS or a condition of a locking clip.

3. The computing system of claim 2, further including a pressure sensor to generate seat pressure sensor data associated with the vehicle cabin, wherein the weight of the child is to be determined further based on the seat pressure data.

4. The computing system of claim 2, further including a strain sensor to generate strain sensor data associated with the vehicle cabin, wherein the seat belt tension is to be determined further based on the strain sensor data.

5. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:
conduct an automated vision analysis of image data associated with an interior of a vehicle cabin;
identify one or more safety constraints based on a geographic location of the vehicle cabin;
determine a state of a child restraint system (CRS) based on the automated vision analysis and the identified one or more safety constraints; and
generate an alert if the state of the CRS does not satisfy the one or more safety constraints.

6. The semiconductor apparatus of claim 5, wherein the state includes one or more of an age of a child in the CRS, a weight of the child in the CRS, an orientation of the CRS, a location of the CRS within the vehicle cabin, a tilt angle of the CRS, a seat belt tension associated with the CRS or a condition of a locking clip.

7. The semiconductor apparatus of claim 6, wherein the weight of the child is to be determined further based on seat pressure data associated with the vehicle cabin.

8. The semiconductor apparatus of claim 6, wherein the seat belt tension is to be determined further based on strain sensor data associated with the vehicle cabin.

9. The semiconductor apparatus of claim 5, wherein the geographic location is a current geographic location and the current geographic location is to be determined further based on Global Positioning System (GPS) data.

10. The semiconductor apparatus of claim 5, wherein the geographic location is a future geographic location and the future geographic location is to be determined further based on navigation route data.

11. At least one computer readable non-transitory storage medium comprising a set of instructions, which when executed by a computing system, cause the computing system to:
conduct an automated vision analysis of image data associated with an interior of a vehicle cabin;
identify one or more safety constraints based on a geographic location of the vehicle cabin;
determine a state of a child restraint system (CRS) based on the automated vision analysis and the identified one or more safety constraints; and
generate an alert if the state of the CRS does not satisfy the one or more safety constraints.

12. The at least one computer readable non-transitory storage medium of claim 11, wherein the state includes one or more of an age of a child in the CRS, a weight of the child in the CRS, an orientation of the CRS, a location of the CRS within the vehicle cabin, a tilt angle of the CRS, a seat belt tension associated with the CRS or a condition of a locking clip.

13. The at least one computer readable non-transitory storage medium of claim 12, wherein the weight of the child is to be determined further based on seat pressure data associated with the vehicle cabin.

14. The at least one computer readable non-transitory storage medium of claim 12, wherein the seat belt tension is to be determined further based on strain sensor data associated with the vehicle cabin.

15. The at least one computer readable non-transitory storage medium of claim 11, wherein the geographic location is a current geographic location and the current geographic location is to be determined further based on Global Positioning System (GPS) data.

16. The at least one computer readable non-transitory storage medium of claim 11, wherein the geographic location is a future geographic location and the future geographic location is to be determined further based on navigation route data.

17. A method comprising:
conducting an automated vision analysis of image data associated with an interior of a vehicle cabin;
identifying one or more safety constraints based on a geographic location of the vehicle cabin;
determining a state of a child restraint system (CRS) based on the automated vision analysis; and
generating an alert if the state of the CRS does not satisfy the one or more safety constraints and the identified one or more safety constraints.

18. The method of claim 17, wherein the state includes one or more of an age of a child in the CRS, a weight of the child in the CRS, an orientation of the CRS, a location of the CRS within the vehicle cabin, a tilt angle of the CRS, a seat belt tension associated with the CRS or a condition of a locking clip.

19. The method of claim 17, wherein the weight of the child is determined further based on seat pressure data associated with the vehicle cabin.

20. The method of claim 17, wherein the seat belt tension is determined further based on strain sensor data associated with the vehicle cabin.

* * * * *